(12) United States Patent
Imai (10) Patent No.: US 9,521,383 B2
(45) Date of Patent: Dec. 13, 2016

(54) IMAGE PROCESSING APPARATUS, PROJECTOR, AND IMAGE PROCESSING METHOD

(71) Applicant: SEIKO EPSON CORPORATION, Tokyo (JP)

(72) Inventor: Shun Imai, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 108 days.

(21) Appl. No.: 14/180,675

(22) Filed: Feb. 14, 2014

(65) Prior Publication Data

US 2014/0267341 A1    Sep. 18, 2014

(30) Foreign Application Priority Data

Mar. 14, 2013  (JP) .................... 2013-051381

(51) Int. Cl.
*G03B 21/14* (2006.01)
*H04N 9/31* (2006.01)

(52) U.S. Cl.
CPC .................. *H04N 9/3185* (2013.01)

(58) Field of Classification Search
None
See application file for complete search history.

(56) References Cited

U.S. PATENT DOCUMENTS

| 7,121,667 | B2* | 10/2006 | Moriwaki et al. ............. 353/30 |
| 8,287,136 | B2 | 10/2012 | Kobori et al. |
| 2002/0060754 | A1* | 5/2002 | Takeuchi ............... H04N 5/74 348/745 |
| 2009/0027398 | A1* | 1/2009 | Frisken ............... G06T 11/203 345/442 |
| 2010/0014778 | A1* | 1/2010 | Imai ............................ 382/275 |

FOREIGN PATENT DOCUMENTS

| JP | A-2004-228619 | 8/2004 |
| JP | A-2010-78534 | 4/2010 |

\* cited by examiner

*Primary Examiner* — Zhengxi Liu
*Assistant Examiner* — Yanna Wu
(74) *Attorney, Agent, or Firm* — Oliff PLC (57) ABSTRACT

An image processing apparatus includes a display control section that controls a projection device to project a correction image, a captured image data acquisition section that acquires the correction image, a judgment section that judges, when the correction image expressed by the captured image data is placed in a plane with a coordinate system, which of the following functions: a function representing a straight line; and a function representing a curved line is used to make image correction based on the distance between the correction image and at least one of a line expressed by the function representing a straight line and a line expressed by the function representing a curved line, and a presentation section that presents a user with an operation screen for correction using the function judged by the judgment section.

10 Claims, 6 Drawing Sheets

STRAIGHT LINE MODEL   f(x) = ax+b
→ LARGE AMOUNTS OF DISCREPANCY

FIG. 7B

CURVED LINE MODEL   f(x) = a(x²-p)+q
→ SMALL AMOUNTS OF DISCREPANCY

FIG. 9

IMAGE PROCESSING APPARATUS, PROJECTOR, AND IMAGE PROCESSING METHOD

CROSS-REFERENCE TO RELATED APPLICATION

The entire disclosure of Japanese Patent Application No. 2013-051381, filed Mar. 14, 2013 is expressly incorporated by reference herein.

BACKGROUND

1. Technical Field

The present invention relates to an image processing apparatus, a projector, and an image processing method.

2. Related Art

When a projector is installed in a position shifted from an ideal position relative to a screen, an image projected on the screen is distorted. Further, when a surface on which the image is projected is not a flat surface, the projected image is also distorted. In view of the fact described above, there is a known a projector provided with a function of correcting distortion of a projected image. JP-A-2004-228619 discloses that a projector apparatus having an on-screen function corrects distortion of an image projected on a screen having a curved surface. Further, JP-A-2010-78534 discloses that distortion-free video images are displayed by detecting the shape of a curved surface on which video images are projected and displayed and non-uniformly rearranging the pixels of the displayed images in accordance with the detected shape of the curved surface (distortion reverse correction).

Some screens do not have fixed curvature because they are formed, for example, by combining a flat surface and a curved surface, and using a single correction method over the entire screen of this type results in inappropriate correction in some cases. The technologies described in JP-A-2004-228619 and JP-A-2010-78534 allow correction of distortion of an image projected on a screen having a curved surface, but when an image is projected on a screen that does not have fixed curvature, proper correction may not be achieved or a user is required to perform complicated operation even when proper correction is achieved in some cases.

SUMMARY

An advantage of some aspects of the invention is to reduce user's operation burden associated with distortion correction made when an image is projected on a screen.

An aspect of the invention provides an image processing apparatus including a display control section that controls a projection device that projects an image on a projection surface to project a correction image, a captured image data acquisition section that acquires captured image data obtained by capturing the correction image projected by the projection device, a judgment section that judges, when the correction image expressed by the captured image data acquired by the captured image data acquisition section is placed in a plane with a coordinate system, which of the following functions: a function representing a straight line; and a function representing a curved line is used to make image correction based on the distance between the correction image and at least one of a line expressed by the function representing a straight line and a line expressed by the function representing a curved line, and a presentation section that presents a user with an operation screen for correction using the function judged by the judgment section to be used for the image correction. The image processing apparatus reduces user's operation burden associated with distortion correction made when an image is projected on a screen.

In another preferable aspect, the judgment section calculates the distance between the correction image expressed by the captured image data acquired by the captured image data acquisition section and the line expressed by the function representing a straight line, and when the calculated distance is smaller than a predetermined threshold, the judgment section judges the function representing a straight line to be used for the image correction. The image processing apparatus reduces user's operation burden associated with distortion correction made when an image is projected on a screen.

In still another preferable aspect, the correction image is a figure surrounded by a plurality of sides, and the judgment section makes the judgment for each of the plurality of sides based on the distance between each of a plurality of points on the side and at least one of the line expressed by the function representing a straight line and the line expressed by the function representing a curved line. The image processing apparatus reduces user's operation burden associated with distortion correction made when an image is projected on a screen.

Another aspect of the invention provides a projector including a projection device that projects an image on a projection surface, a display control section that controls the projection device to project a correction image, a captured image data acquisition section that acquires captured image data obtained by capturing the correction image projected by the projection device, a judgment section that judges, when the correction image expressed by the captured image data acquired by the captured image data acquisition section is placed in a plane with a coordinate system, which of the following functions: a function representing a straight line; and a function representing a curved line is used to make image correction based on the distance between the correction image and at least one of a line expressed by the function representing a straight line and a line expressed by the function representing a curved line, and a presentation section that presents a user with an operation screen for correction using the function judged by the judgment section to be used for the image correction. The projector reduces user's operation burden associated with distortion correction made when an image is projected on a screen.

Still another aspect of the invention provides an image processing method including causing a projection device that projects an image on a projection surface to project a correction image, acquiring captured image data obtained by capturing the projected correction image, judging, when the correction image expressed by the acquired captured image data is placed in a plane with a coordinate system, which of the following functions: a function representing a straight line; and a function representing a curved line is used to make image correction based on the distance between the correction image and at least one of a line expressed by the function representing a straight line and a line expressed by the function representing a curved line, and presenting a user with an operation screen for correction using the function judged to be used for the image correction. The image processing method reduces user's operation burden associated with distortion correction made when an image is projected on a screen.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
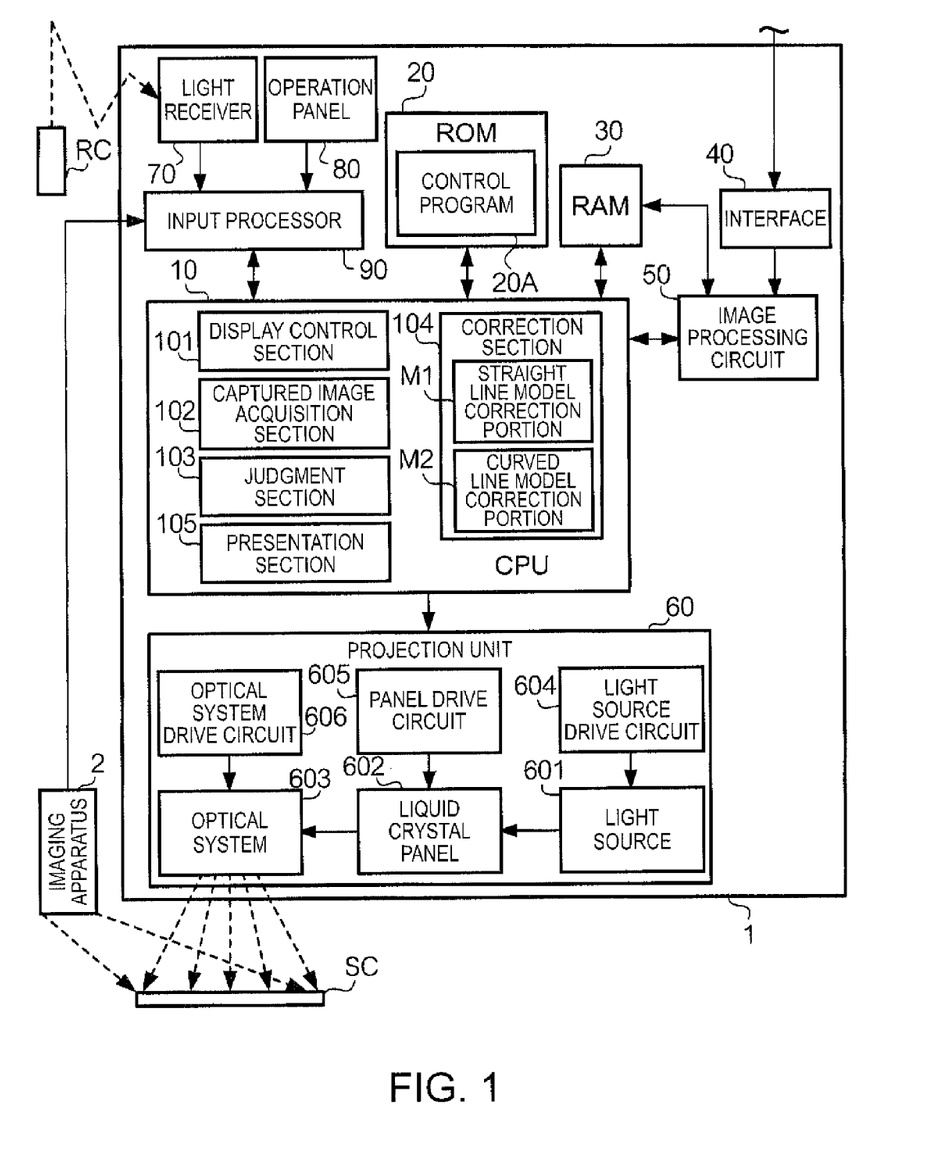
FIG. 1 is a block diagram showing an internal configuration of a projector.

FIG. 1 is a block diagram showing an internal configuration of a projector 1 according to an embodiment of the invention. The projector 1 is an apparatus that projects an image according to an inputted video signal (hereinafter referred to as "primary image") on a screen SC. The screen SC is a surface on which an image projected from the projector 1 is displayed. When a projection axis of the projector 1 is inclined to the screen SC and deviates from an ideal state or when the screen SC does not have a flat surface, an image displayed on the screen SC is distorted. The projector 1 has a function of correcting distortion of an image displayed on the screen SC. In the following description, a process of correcting distortion on an image carried cut by the projector 1 is expressed as "distortion correction." The distortion correction is made when a user operates a controller RC. The controller RC is an apparatus that allows the user to control the projector 1 or what is called a remote control based on infrared communication or any other wireless communication.

The projector 1 projects an image for correction based on which the user makes the distortion correction (hereinafter referred to as "correction image") on the screen SC. The correction image functions as a user interface for the distortion correction. The user operates the controller RC while looking at the correction image projected on the screen SC to correct distortion of the image. The correction image includes a plurality of correction points that are moved in response to user's operation. An imaging apparatus 2 captures the correction image projected on the screen SC and outputs image data representing the captured image. The imaging apparatus 2 is externally connected to the projector 1, and the projector 1 analyzes the image data outputted from the imaging apparatus 2 and corrects distortion of the image displayed on the screen SC based on an analysis result. When the projector 1 projects an image forward, the imaging apparatus 2 may be disposed behind a projection lens of the projector 1. The imaging apparatus 2 may instead be built in the projector 1.

The projector 1 includes a CPU (central processing unit) 10, a ROM (read only memory) 20, a RAM (random access memory) 30, an IF (interface) 40, an image processing circuit 50, a projection unit (an example of a projection device) 60, a light receiver 70, an operation panel 80, and an input processor 90. The CPU 10 is a controller that controls the components of the projector 1 by executing a control program. The ROM 20 is a storage device that stores a variety of programs and data. The ROM 20 stores a control program 20A executed by the CPU 10 and correction image data representing the correction image. The RAM 30 is used as a work area when the computing device executes the program stored in the ROM 20. The IF 40 acquires a video signal from an external apparatus, such as a DVD (digital versatile disc) player or a personal computer. The IF 40 includes a variety of terminals to be connected to the external apparatus (for example, USE (universal serial bus) terminal, LAN (local area network) terminal, S terminal, RCA terminal, D-sub (D—subminiature) terminal, and HDMI (high-definition multimedia interface) terminal). The IF 40 further extracts vertical and horizontal sync signals from the acquired video signal. The image processing circuit 50 performs image processing on images carried by the video signal.

The projection unit 60 includes a light source 601, a liquid crystal panel 602, an optical system 603, a light source drive circuit 604, a panel drive circuit 605, and an optical system drive circuit 606. The light source 601 has a high-pressure mercury lamp, a halogen lamp, a metal-halide lamp, or any other suitable lamp or any other light emitter and illuminates the liquid crystal panel 602 with light. The liquid crystal panel 602 is a light modulator that modulates the light emitted from the light source in accordance with the image data. In the example, the liquid crystal panel 602 has a plurality of pixels arranged in a matrix. The liquid crystal panel 602, for example, has XGA-grade resolution (XGA stands for eXtended Graphics Array) and has a display area formed of 1024×768 pixels. In the example, the liquid crystal panel 602 is a transmissive liquid crystal panel, and the transmittance of each of the pixels is controlled in accordance with the image data. The projector 1 has three liquid crystal panels 602 corresponding to the RGB three primary colors. The light from the light source 601 is separated into RGB three color light fluxes, each of which is incident on the corresponding liquid crystal panel 602. The color light fluxes having passed through and having been modulated by the liquid crystal panels are combined by a cross dichroic prism or any other component and outputted to the optical system 603. The optical system 603 includes a lens that enlarges the light having been modulated into image light by the liquid crystal panels 602 and projects the enlarged image light on the screen SC, a zoom lens that enlarges or reduces an image to be projected and makes focus adjustment, a zoom adjustment motor that adjusts the degree of zooming, a focus adjustment motor that makes focus adjustment, and other components. The light source drive circuit 604 drives the light source 601 under the control of the CPU 10. The panel drive circuit 605 drives the liquid crystal panels 602 in accordance with the image data outputted from the CPU 10. The optical system drive circuit 606 drives the motors provided in the optical system 603 under the control of the CPU 10.

The light receiver 70 receives an infrared signal transmitted from the controller RC, decodes the received infrared signal, and outputs the decoded signal to the input processor 90. The operation panel 80 has buttons and switches that allow the user to power on/off the projector 1 and perform a variety of types of operation. The input processor 90 produces information representing operation performed by the user through the controller RC or the operation panel 80 and outputs the produced information to the CPU 10.

The CPU 10 executes the program stored in the ROM 20 to provide a display control section 101, a captured image data acquisition section 102, a judgment section 103, a correction section 104, and a presentation section 105. The display control section 101 outputs data representing a predetermined correction image (hereinafter referred to as "correction data") to the projection unit 60 at timing indicated by the sync signals. The projection unit 60 projects a correction image in accordance with data supplied from the CPU 10 on the screen SC. The correction image projected on the screen SC is captured by the imaging apparatus 2, and data representing the captured image (hereinafter referred to as "captured image data") is supplied to the projector 1. In the embodiment, an image formed of a plurality of correction points that form a rectangle is used as the correction image.

The captured image data acquisition section 102 acquires the captured image data produced in the operation of capturing the correction image projected by the projection unit 60. The judgment section 103 judges, when the correction image expressed by the captured image data acquired by the captured image data acquisition section 102 is placed in a plane with a coordinate system, which function, a function representing a straight line (hereinafter referred to as "straight line model") or a function representing a curved line (hereinafter referred to as "curved line model"), is used for image correction based on the distance between a line (or point) contained in the correction image and at least one of a line expressed by the function representing a straight line and a line expressed by the function representing a curved line.

In the embodiment, the judgment section 103 calculates the distance between the correction image expressed by the captured image data acquired by the captured image data acquisition section 102 and the straight line model, and when the calculated distance is smaller than a predetermined threshold, the judgment section 103 judges the straight line model to be the function used for the image correction. The correction section 104 has a straight line model correction portion M1 and a curved line model correction portion M2. The straight line model correction portion M1 makes the distortion correction by using the straight line model based on user's operation. On the other hand, the curved line model correction portion M2 makes the distortion correction by using the curved line model based on user's operation.

The presentation section 105 presents the user with an operation screen that allows the user to make correction using the function judged by the judgment section 103 to be used for the image correction. In the embodiment, the presentation section 105 supplies the projection unit 60 with image data representing one of the following GUI screens based on a judgment result from the judgment section 103: a GUI screen that allows the user to make correction based on the straight line model (hereinafter referred to as "linear correction"); and a GUI screen that allows the user to make correction based on the curved line model (hereinafter referred to as "curved line correction"), and the projection unit 60 displays the supplied GUI screen. The user uses the projected GUI screen to make the distortion correction.

Figure 2:
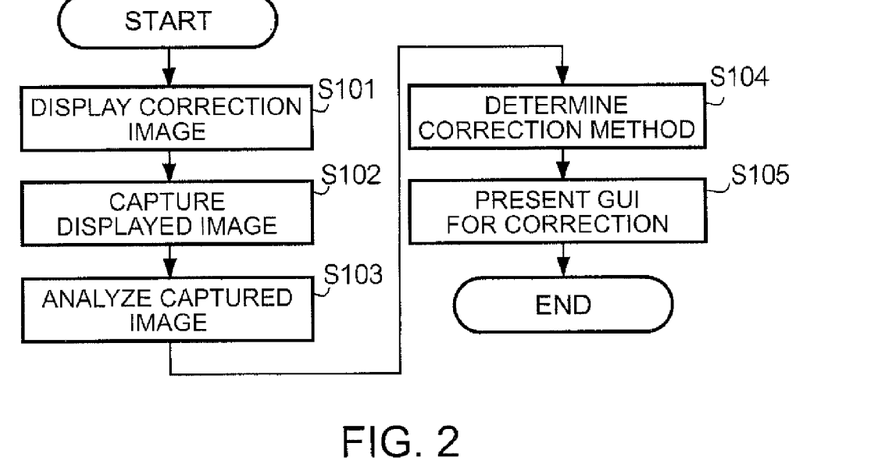
FIG. 2 is a flowchart showing distortion correction.

FIG. 2 is a flowchart showing the distortion correction in the projector 1. The following processes are initiated, for example, when the user operates the controller RC to input an instruction to start the distortion correction and the CPU 10 reads and executes the control program 20A in response to the user's operation. In step S101, the CPU 10 reads the correction data stored in the ROM 20 and supplies the projection unit 60 with the read correction data. The projection unit 60 projects the correction image on the screen SC in accordance with the correction data supplied from the CPU 10.

Figure 3:
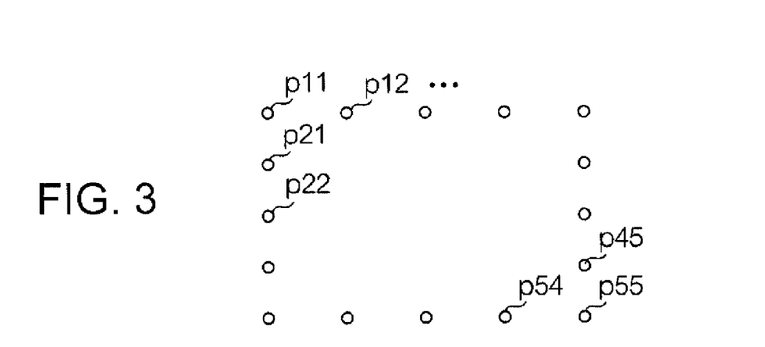
FIG. 3 shows an example of a correction image and correction points.

FIG. 3 shows an example of the correction image. In the embodiment, an image as shown in FIG. 3 formed of a plurality of correction points p11, p12, . . . , p55 that form a rectangle is used as the correction image. The CPU 10 instructs the projection unit 60 to project the plurality of correction points on the screen SC. The imaging apparatus 2 captures the correction image projected on the screen SC and supplies the projector 1 with captured image data representing the captured image.

Figure 4:
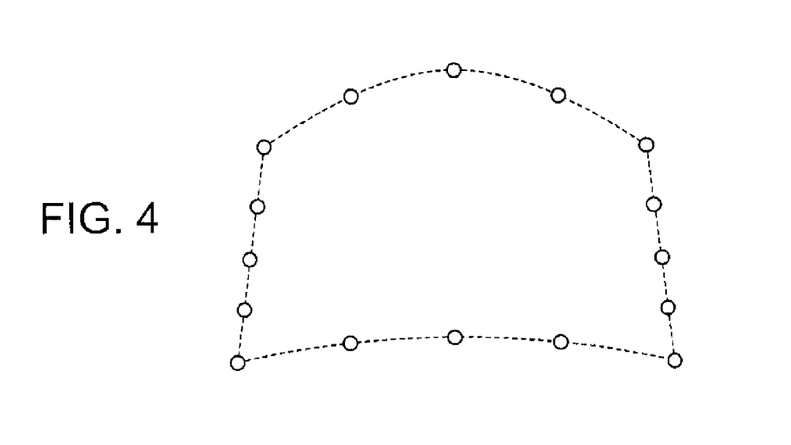
FIG. 4 shows an example of the correction image and the correction points projected on a screen.

FIG. 4 shows the correction image projected on the screen SC. The example shown in FIG. 4 shows a case by way of example where the screen SC on which the correction image is projected has a curved surface. As shown in FIG. 4, the trains of the correction points projected on the screen SC are distorted in accordance with the curvature of the screen SC.

Figure 5A:
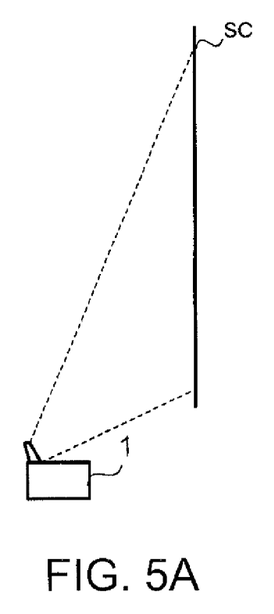
FIGS. 5A and 5B describe a mechanism in accordance with which an image projected on a screen is distorted.
Figure 5B:
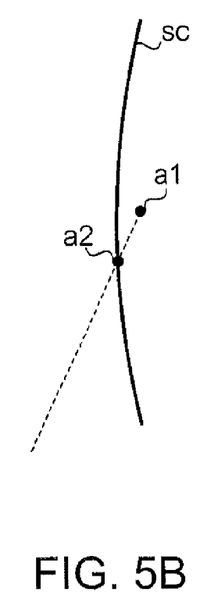

FIGS. 5A and 5B describe a mechanism in accordance with which an image projected on the screen SC is distorted. Unlike a case where a surface on which an image is projected is a flat surface (see FIG. 5A), in the case where the screen SC on which an image is projected has a curved projection surface, there is a discrepancy between an ideal projection positional and an actual projection position a2 as shown in FIG. 5B, and the discrepancy causes image distortion.

The description with reference to FIG. 2 resumes. In step S103, the CPU 10 analyzes the captured image data supplied from the imaging apparatus 2. In the embodiment, the CPU 10 analyzes the captured image data to calculate coordinates of each of the correction points. In step S104, the CPU 10 determines a correction method for each of the four sides or the upper, lower, right, and left sides of the image of the rectangle formed of the correction points based on an analysis result in step S103.

Figure 6:
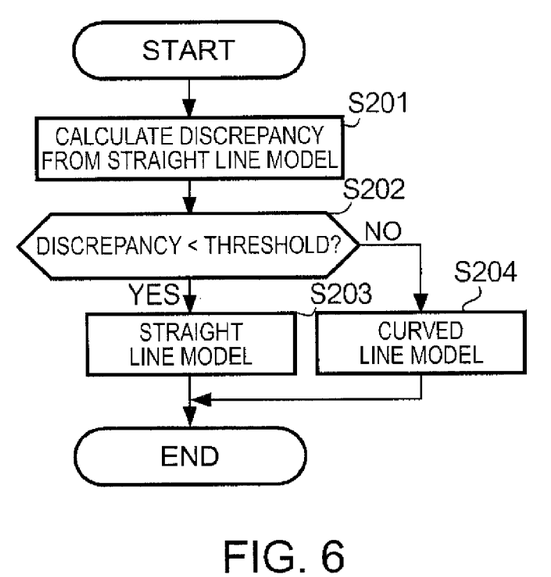
FIG. 6 is a flowchart showing a process of determining a calculation model.

FIG. 6 is a flowchart showing the procedure of the determination process shown in step S104 in FIG. 2. In the embodiment, the CPU 10 first determines constants "a" and "b" in the expression of the straight line model by using a method of least squares based on the coordinates of correction points that form the upper side of the image of the rectangle. In the embodiment, the CPU 10 uses the following Expression (1) as the straight line model and the following Expression (2) as the curved line model.

$$f(x)=ax+b \quad (1)$$

$$f(x)=a(x-p)^2+q \quad (2)$$

Thereafter, in step S201, the CPU 10 calculates the distance between the linear function f(x) expressed by the determined constants "a" and "b" and each of the correction points that form the upper side of the captured image of the rectangle. In step S202, the CPU 10 judges whether the calculated distance is smaller than a predetermined threshold. When the distance is smaller than the threshold, the CPU 10 judges to make the linear correction, that is, chooses the straight line model (step S203). On the other hand, when the distance is greater than or equal to the threshold, the CPU 10 judges to make the curved line correction, that is, chooses the curved line model (step S204). The CPU 10 also carries out the processes shown in FIG. 6 for the sides other than the upper side (lower, right, and left sides) to judge whether the linear correction or the curved line correction is made based on the distance between the coordinates of each of the correction points that form each of the sides and the expression of the straight line model.

Figure 7A:
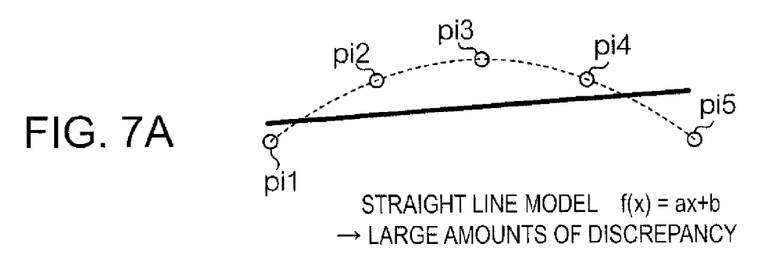
FIGS. 7A and 7B describe the process of determining a calculation model.
Figure 7B:
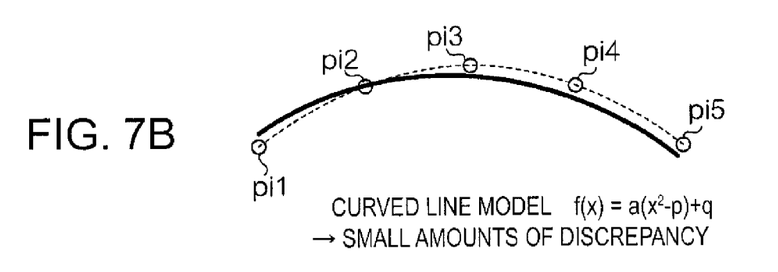

FIGS. 7A and 7B describe the process of determining the calculation model. In FIGS. 7A and 7B, correction points pi1, pi2, pi3, pi4, and pi5 are images of the correction points captured by the imaging apparatus 2. In the example shown in FIGS. 7A and 7B, the captured images of the correction points greatly deviate from the straight line model, whereas deviating from the curved line model by smaller amounts. The CPU 10 calculates the distance between the coordinates of each of the correction points and the straight line model, and when the sum of the calculated distances is smaller than a predetermined threshold, the CPU 10 chooses the straight line model, whereas when the sum of the calculated distances is greater than or equal to the predetermined threshold, the CPU 10 chooses the curved line model.

The description with reference to FIG. 2 resumes. After the correction method is determined, the CPU 10 supplies in step S105 the projection unit 60 with data representing a GUI screen for correction in accordance with the judgment result in step S104 and instructs the projection unit 60 to display the GUI screen. In this process, the CPU 10 displays the GUI screen for the linear correction for a side judged in step S104 to undergo the linear correction, whereas displaying the GUI screen for the curved line correction for a side judged in step S104 to undergo the curved line correction.

Figure 8A:
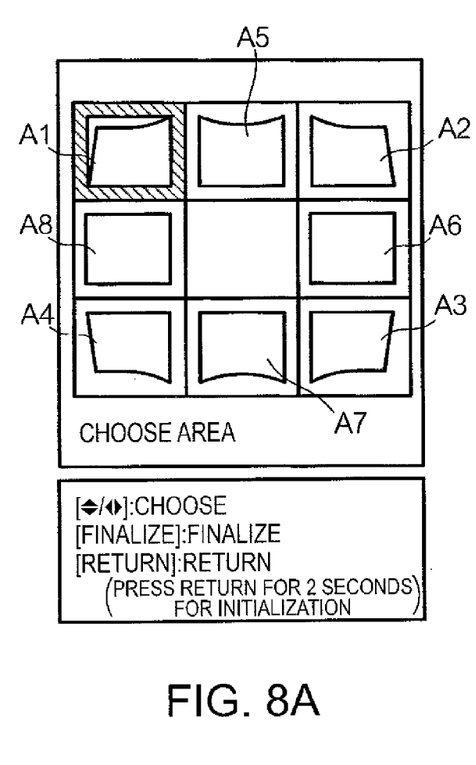
FIGS. 8A to 8C show examples of a GUI screen.
Figure 8B:
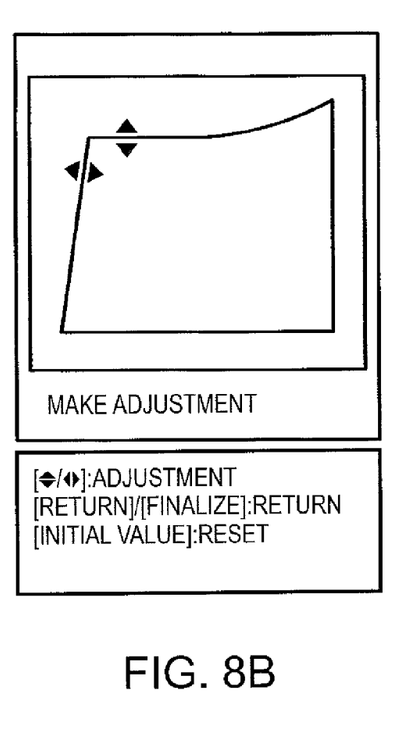
Figure 8C:
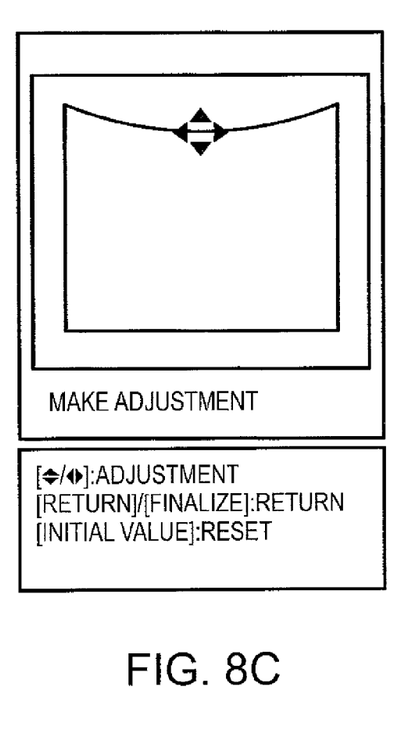

FIGS. 8A to 8C show examples of the GUI screen projected by the projection unit 60. On the screen SC are displayed GUI screens that allow the user to make the distortion correction, such as those shown in FIGS. 8A, 8B, and 8C. The distortion correction is made by using the coordinates of a predetermined correction point. In the example, the predetermined correction point on a side to which the straight line model is applied is formed of two points, the vertices at both ends of the side, whereas the predetermined correction point on a side to which the curved line model is applied is formed of three points in total, the vertices at both ends of the side and the middle point thereof. First, a GUI screen that allows the user to choose a correction point the position of which should be adjusted is displayed, as shown in FIG. 8A. In the example, choices in the GUI screen are roughly classified into those where the position of a vertex is adjusted (A1, A2, A3, and A4) and those where the position of the middle point of a side is adjusted (A5, A6, A7, and A8). The example shown in FIGS. 8A to 8C illustrate GUI screens by way of example in a case where the upper and lower sides of a projected image are judged to undergo the curved line correction and the right and left sides of the projected image are judged to undergo the linear correction.

In the screen shown in FIG. 8A, the user uses the controller RC or the operation panel 80 to choose a correction point that the user intends to correct. When the user chooses any of the choices A1, A2, A3, and A4, a GUI screen that allows the user to adjust the position of a vertex, such as that shown in FIG. 8B, is displayed. When the user adjusts the position of the vertex by using the controller RC or the operation panel 80, the CPU 10 moves the position of the vertex in accordance with information outputted from the controller RC or the operation panel 80 and updates the displayed screen.

After the user adjusts the position of the vertex and when the curved line model is applied to a side one end point of which is the adjusted vertex, the GUI screen switches to that shown in FIG. 8C for adjustment of the position of the middle point (that is, curvature of curved line). In this case, a GUI screen that allows the user to adjust the position of the middle point of the side, such as that shown in FIG. 8C, is displayed. In the screen shown in FIG. 8C, the user adjusts the position of the middle point of the side by using the controller RC or the operation panel 80. On the other hand, when the user chooses any of the choices A1 to A4 in the screen shown in FIG. 8A and only the linear model is applied to the side one end of which is the chosen vertex, the position of the vertex is adjusted in the GUI screen shown in FIG. 8B and then the adjustment is terminated without transition to the GUI screen shown in FIG. 8C.

Further, in the GUI screen shown in FIG. 8A, when the user chooses any of the choices A5, A6, A7, and A8, the CPU 10 changes the GUI screen to that shown in FIG. 8C without transition to that shown in FIG. 8B and displays the GUI screen that allows the user to adjust the position of the middle point of the side to which the curved line model is applied (that is, curvature of curved line). On the other hand, in the GUI screen shown in FIG. 8A, when the user chooses any of the choices A5, A6, A7, and A8 and the straight line model is applied to the chosen side, the CPU 10 does not change the GUI screen to neither that shown in FIG. 8B nor that shown in FIG. 8C but terminates the adjustment. In either of the GUI screens shown in FIGS. 8B and 8C, when the user moves a correction point, the moved correction point is used to make correction (coordinate conversion) in realtime. It is noted that the GUI screen shown in FIG. 8A may be so configured that among the choices A5 to A8, the user cannot choose a choice of a side to which the linear model is applied (the choice may be displayed as a blackout choice, for example).

A specific process procedure will now be described with reference to FIGS. 8A to 8C. In the screen shown in FIG. 8A, the user chooses a correction point that the user intends to correct by using the controller RC or the operation panel 80. When the user chooses any of the choices A1, A2, A3, and A4, a GUI screen that allows the user to adjust the position of the vertex, such as that shown in FIG. 8B, is displayed. FIG. 8B is a GUI screen that allows the user to adjust the position of the upper left vertex of a projected image of a rectangle. In the screen shown in FIG. 8B, the user adjusts the position of the upper left vertex by using the controller RC or the operation panel 80. The CPU 10 moves the position of the upper left vertex in accordance with information outputted from the controller RC or the operation panel 80 and updates the displayed screen.

After the user adjusts the position of the vertex and when the curved line model is applied to a side one end of which is the adjusted vertex, the GUI screen switches to that shown in FIG. 8C for adjustment of the position of the middle point (that is, curvature of curved line). In this case, a GUI screen that allows the user to adjust the position of the middle point of the side, such as that shown in FIG. 8C, is displayed. In the screen shown in FIG. 8C, the user adjusts the position of the middle point of the side by using the controller RC or the operation panel 80. The distortion correction is made as described above.

Figure 9:
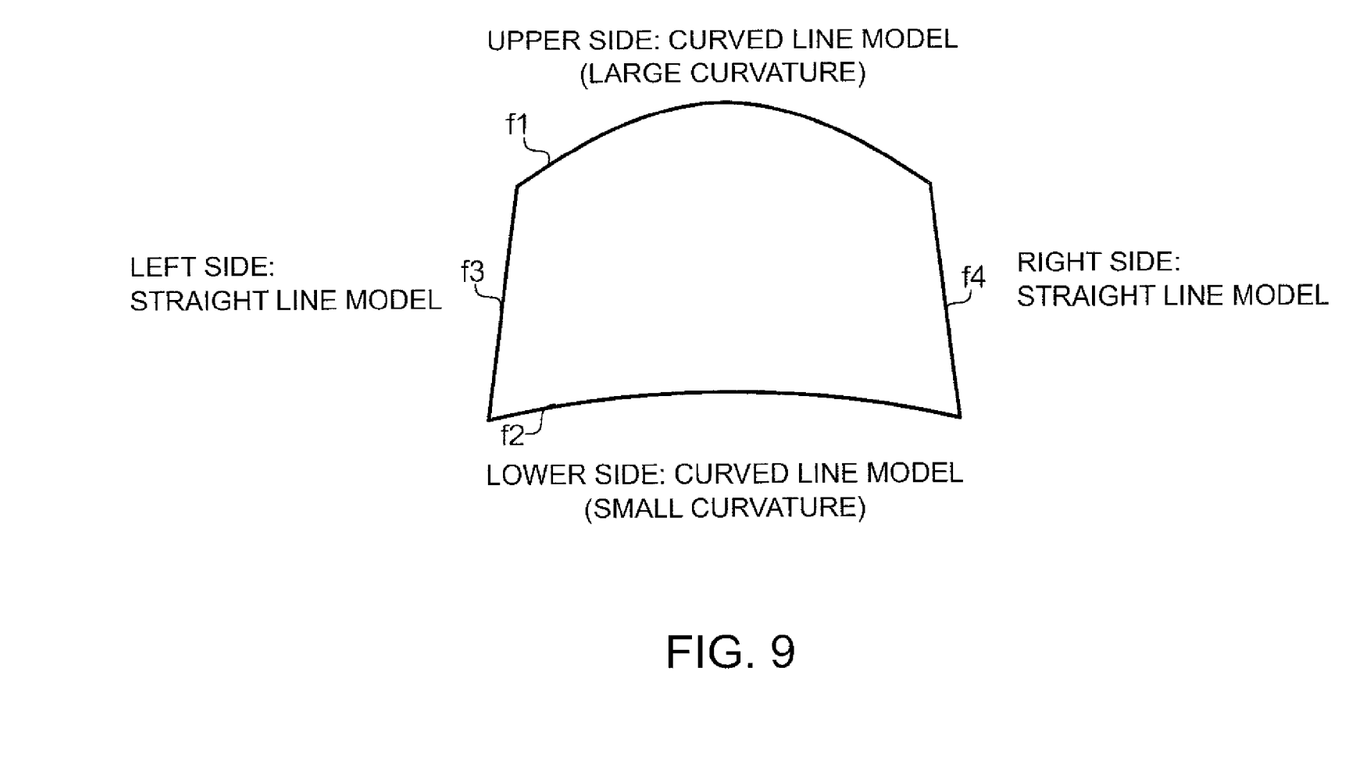
FIG. 9 shows examples of a chosen calculation model.

FIG. 9 shows an example of the calculation model identified for each of the sides. The examples shown in FIG. 9 illustrate a calculation model f1 for the upper side, a calculation model f2 for the lower side, a calculation model f3 for the left side, and a calculation model f4 for the right side. Among the calculation models, the linear model is applied to the left side (f3) and the right side (S4) of the correction image, whereas the curved line model is applied to the upper and lower sides. Further, the curved line model for the upper side has curvature greater than that of the curved line model for the lower side. In the embodiment, a calculation model appropriate for each of the sides that form the contour of the correction image is identified as shown in FIG. 9 by way of example, and a GUI screen that allows the user to make the distortion correction by using the identified calculation model is displayed. As a result, the user does not need to switch the linear correction to the curved line correction and vice versa whenever a side that undergoes the distortion correction is switched to another, and user's operation burden associated with the distortion correction is reduced.

Variations

The invention is not limited to the embodiment described above, and a variety of variations are conceivable. Some variations will be described below. Among the variations described below, two or more of them may be combined with each other.

1. Variation 1

In the embodiment described above, an image having a plurality of correction points arranged along the contour of a rectangle is used as the correction image, but the correction image is not limited thereto and may be any other suitable image. For example, the correction image may be an image having correction points arranged in a two-dimensional grid pattern formed of rows and columns. Further, the correction image may be an image representing the contour of a rectangle. When a correction image that does not explicitly show correction points, such as an image of a rectangle, is used as the correction image, a point on a side or a vertex thereof of the correction image or any other characteristic point of the correction image is used as a correction point in the distance calculation. Further, the shape, pattern, and color of the correction image are not those presented in the embodiment. For example, the correction image may have a polygonal shape other than a rectangular shape. Even when an image of a polygon other than a rectangle is used as the correction image, an image of a correction point contained in the correction image may be captured and a judgment may be made on which types of correction, the linear correction or the curved line correction, is made based on the distance between the position of the captured image of the correction point and a line expressed by a predetermined calculation model, as in the embodiment described above.

Further, in the embodiment described above, the CPU 10 calculates a discrepancy from a calculation model for each of the four sides, but the discrepancy is not necessarily calculated for all the sides and a discrepancy from a calculation model may be calculated for part of the sides. For example, the CPU 10 may calculate a discrepancy from a calculation model for each of the upper and left sides but may not calculate a discrepancy from a calculation model for each of the lower and right sides. In this case, to correct the upper and lower sides, the CPU 10 may choose the linear correction or the curved line correction to be made based on the discrepancy calculated for the upper side, and to correct the right and left sides, the CPU 10 may choose the linear correction or the curved line correction to be made based on the discrepancy calculated for the left side. Further, the CPU 10 may calculate a discrepancy from a calculation model for part of the sides and determine a correction method to be applied to all the sides based on a calculation result.

2. Variation 2

In the embodiment described above, the CPU 10 calculates the distance between the coordinates of each correction point and the straight line model and judges whether or not the sum of the calculated distances is greater than or equal to a predetermined threshold to judge which types of correction, the linear correction or the curved line correction, is made. The judgment is not necessarily made in this way but may be made another way. For example, the CPU 10 may calculate the distance between the coordinates of each correction point and the curved line model and judges whether or not the sum of the calculated distances is smaller than a predetermined threshold to judge which types of correction, the linear correction or the curved line correction, is made. In this case, the CPU 10 determines the values of the constants "a", "p", and "q" in the curved line model based on the coordinates of the correction points and makes the judgment based on the distance between the quadratic function expressed by the determined constants "a", "p", and "q" and each of the correction points. Further, as another example, the CPU 10 may, for example, calculate the distance between the coordinates of each correction point and the straight line model, calculate the distance between the coordinates of each of the correction points and the curved line model, and choose the model that gives a smaller sum of the calculated distances. As still another example, the CPU 10 may calculate the distance between a calculation model chosen by the judgment section 103 and the coordinates of a captured image of a correction point, and when the calculation result is greater than a predetermined threshold, the CPU 10 may discard the chosen calculation model and choose the other calculation model.

3. Variation 3

In the embodiment described above, the user uses a projected GUI screen along with the operation panel 80 or the controller RC to adjust the shape of an image for the distortion correction. The distortion correction is not necessarily made in this way. For example, the CPU 10 may propose to the user a desirable correction method, the linear correction or the curved line correction, in accordance with a judgment result to prompt the user to choose the linear correction or the curved line correction. Specifically, for example, the CPU 10 may display an image that allows the user to choose the linear correction or the curved line correction (example of operation screen for correction) to prompt the user to check the correction method. In this case, the user uses the operation panel 80 or the controller RC to choose the linear correction or the curved line correction to be made for each side while referring to the notified information. The CPU 10 makes the distortion correction in accordance with a result chosen by the user. Specifically, for example, when the straight line model is chosen, the CPU 10 uses Expression (1) described above as the straight line model, identifies the constants "a" and "b" by using a method of least squares, and uses the identified constants "a" and "b" to make the distortion correction based on Expression (3). On the other hands, to make the curved line correction, the CPU 10 uses Expression (2) described above as the curved line model expression, identifies the constants by using a method of least squares, and uses the identified constants to make the distortion correction based on Expression (4).

$$f'(x) = -ax + b \quad (3)$$

$$f'(x) = -a(x-p)^2 + q \quad (4)$$

The calculation models used in the distortion correction are not limited to those described above, and other calculation models may be used. For example, an exponential function, a trigonometric function, or any other function representing a curved line may be used as the expression of the curved line model. Further, Expressions (3) and (4) and other expressions for calculation used in the variations described above are presented only by way of example, and other expressions for calculation may be used to make the distortion correction.

4. Variation 4

The projector 1 is an example of an image processing apparatus according to an embodiment of the invention. The image processing apparatus according to the embodiment of the invention is not limited to a projector and may instead be, for example, a PC (personal computer) or any other apparatus. In this case, for example, a PC to which the imaging apparatus is connected may be used to choose the linear correction or the curved line correction and output a GUI screen for the distortion correction to the projector.

5. Variation 5

Processes according to an embodiment of the invention are not limited to those shown in the flowcharts described above. For example, although the above embodiment has been described with reference to the case where a correction image alone is projected on the screen SC, a combined image that is a combination of a primary image and a correction image may instead be projected on the screen SC.

6. Variation 6

In the embodiment, the control program 20A executed by the projector 1 may instead be provided in the form of a program stored in a variety of recording media, such as a magnetic recording medium (such as magnetic tape and magnetic disk (HDD and FD (flexible disk))), an optical recording medium (such as optical disc (CD (compact disc) and DVD (digital versatile disc))), a magneto-optical recording medium, or semiconductor memory (such as flash ROM)). The control program 20A may still instead be downloaded via the Internet or any other network.

7. Other Variations

The internal configuration of the projector 1 is not limited to that described in FIG. 1. The projector 1 may have any internal configuration capable of carrying out the process in each of the steps shown in FIG. 2.

What is claimed is:

1. An image processing apparatus comprising:
   a memory that stores instructions, and a controller configured to execute the instructions stored in the memory to:
   control a projection device that projects an image on a projection surface to project a correction image;
   acquire captured image data obtained by capturing the correction image projected by the projection device;
   calculate (i) a distance between the correction image and a line expressed by a function representing a straight line and (ii) a distance the correction image and a line expressed by a function representing a curved line;
   judge, when the correction image expressed by the acquired captured image data is placed in a place with a coordinate system, which of the following functions: a function representing a straight line; and a function representing a curved line is used to make image correction based on both (i) the distance between the correction image and the line expressed by the function representing a straight line and (ii) the distance between the correction image and the line expressed by the function representing a curved line;
   present a user with an operation screen for correction using the judged function to be used for the image correction, the operation screen including first correction points to adjust positions of two vertexes and a second correction point to adjust a middle point of a line connecting two vertexes; and
   allow the user to adjust only the first correction points when the controller judges that the function representing a straight line is used to make image correction.

2. The image processing apparatus according to claim 1, wherein the correction image is a figure surrounded by a plurality of sides, and the controller makes the judgment for each of the plurality of sides based on the distance between each of a plurality of points on the side and the line expressed by the function representing a curved line.

3. The image processing apparatus according to claim 1, wherein the correction image includes a plurality of correction points, and
   the line expressed by the function representing a straight line is a straight line model formed by using coordinates of the plurality of the correction points of the correction image.

4. The image processing apparatus according to claim 3, wherein the line expressed by the function representing a straight line is a straight line model formed by using a method of least squares based on coordinates of the plurality of the correction points of the correction image.

5. A projector comprising:
   a projection device that projects an image on a projection surface;
   a memory that stores instructions, and a controller configured to execute the instructions stored in the memory to:
   control a projection device that projects an image on a projection surface to project a correction image;
   acquire captured image data obtained by capturing the correction image projected by the projection device;
   calculate (i) a distance between the correction image and a line expressed by a function representing a straight line and (ii) a distance between the correction image and a line expressed by a function representing a curved line;
   judge, when the correction image expressed by the acquired captured image data is placed in a plane with a coordinate system which of the following functions: a function representing a straight line; and a function representing a curved line is used to make image correction based on both (i) the distance between the correction image and the line expressed by the function representing a straight line and (ii) the distance between the correction image and the line expressed by the function representing a curved line;
   present a user with an operation screen for correction using the judged function to be used for the image correction, the operation screen including first correction points to adjust positions of two vertexes and a second correction point to adjust a middle point of a line connecting two vertexes; and
   allow the user to adjust only the first correction points when the controller judges that the function representing a straight line is used to make image correction.

6. The projector according to claim 5, wherein the correction image includes a plurality of correction points, and
   the line expressed by the function representing a straight line is a straight line model formed by using coordinates of the plurality of the correction points of the correction image.

7. The projector according to claim 6, wherein the line expressed by the function representing a straight line is a straight line model formed by using a method of least squares based on coordinates of the plurality of the correction points of the correction image.

8. An image processing method comprising:
   causing a projection device that projects an image on a projection surface to project a correction image;

acquiring captured image data obtained by capturing the projected correction image;

calculating (i) a distance between the correction image and a line expressed by a function representing a straight line and (ii) a distance between the correction image and a line expressed by a function representing a curved line;

judging, when the correction image expressed by the acquired captured image data is placed in a plane with a coordinate system, which of the following functions: a function representing a straight line; and a function representing a curved line is used to make image correction based on both (i) the distance between the correction image and the line expressed by the function representing a straight line and (ii) the distance between the correction image and the line expressed by the function representing a curved line;

presenting a user with an operation screen for correction using the judged function to be used for the image correction, the operation screen including first correction points to adjust positions of two vertexes and a second correction point to adjust a middle point of a line connecting two vertexes; and allowing the user to adjust only the first correction points when the controller judges that the function representing a straight line is used to make image correction.

9. The image processing method according to claim 8, wherein the correction image includes a plurality of correction points, and the line expressed by the function representing a straight line is a straight line model formed by using coordinates of the plurality of the correction points of the correction image.

10. The image processing method according to claim 9, wherein the line expressed by the function representing a straight line is a straight line model formed by using a method of least squares based on coordinates of the plurality of the correction points of the correction image.

* * * * *